United States Patent
Nassim

(10) Patent No.: US 7,911,253 B1
(45) Date of Patent: Mar. 22, 2011

(54) HYBRID CLOCK NETWORK

(75) Inventor: Ray Nassim, Phoenix, AZ (US)

(73) Assignee: Marvell International Ltd., Hamilton (BM)

(*) Notice: Subject to any disclaimer, the term of this patent is extended or adjusted under 35 U.S.C. 154(b) by 123 days.

(21) Appl. No.: 12/277,058

(22) Filed: Nov. 24, 2008

Related U.S. Application Data

(60) Provisional application No. 60/991,462, filed on Nov. 30, 2007.

(51) Int. Cl.
*G06F 1/04* (2006.01)

(52) U.S. Cl. .......................................... 327/295; 327/565

(58) Field of Classification Search .................. None
See application file for complete search history.

(56) References Cited

U.S. PATENT DOCUMENTS

| | | | | |
|---|---|---|---|---|
| 6,570,429 B1* | 5/2003 | Hellriegel | ...................... | 327/295 |
| 6,861,884 B1* | 3/2005 | Nguyen et al. | ................ | 327/155 |
| 7,005,907 B2* | 2/2006 | Ibuka | ............................. | 327/295 |
| 7,236,060 B2* | 6/2007 | Wood | ............................. | 331/57 |
| 7,275,011 B2* | 9/2007 | Bueti et al. | ..................... | 702/130 |
| 7,426,706 B2* | 9/2008 | Suaya et al. | ...................... | 716/6 |
| 7,475,374 B1* | 1/2009 | Johnson et al. | ................ | 716/10 |
| 7,512,925 B2* | 3/2009 | Birmiwal et al. | ............... | 716/18 |
| 7,629,827 B2* | 12/2009 | Fukuoka et al. | ............. | 327/295 |
| 2004/0076002 A1* | 4/2004 | Uneme | ........................ | 362/222 |

* cited by examiner

*Primary Examiner* — Cassandra Cox

(57) ABSTRACT

Some of the embodiments of the present invention provide an integrated circuit device including a clock distribution network, the clock distribution network comprising an inner band, an outer band, and a clock distribution tree including a plurality of stages, each stage including a plurality of signal drivers, wherein all signal drivers of at least one stage of the clock distribution tree are placed in an area between the inner band and the outer band. Other embodiments are also described and claimed.

28 Claims, 6 Drawing Sheets

HYBRID CLOCK NETWORK

CROSS REFERENCE TO RELATED APPLICATIONS

The present application claims priority to U.S. Patent Application No. 60/991,462, filed 30 Nov., 2007, entitled "POWER SAVING RING-SHAPED HYBRID (H-TREE/SEMI-GRID) CLOCK NETWORK," the entire specification of which is hereby incorporated by reference in its entirety for all purposes, except for those sections, if any, that are inconsistent with this specification.

TECHNICAL FIELD

Embodiments of the present invention relate to the field of clock networks, and more particularly, to hybrid clock networks.

BACKGROUND

Accurate timing, set by one or more clock signals, is crucial for proper operation of any digital system. Various techniques exist for generating and distributing clock signals over an integrated circuit chip. For example, a primary clock may be generated (or received from an external source through an input/output (I/O) pin) and then routed to various components within the chip that use the clock signal. For example, in a microprocessor, a system clock signal must be distributed to a large number of clock pins, distributed in different parts of the microprocessor.

Clock skew is a relative difference in time that the clock signal takes to reach different parts of the integrated circuit. Ideally, clock signals should have no skew, and the clock signals should reach various components at the same time. However, as the components may be distributed in different areas of the chip, clock signals reaching the components may experience different propagation delays (based on the location of the components on the chip and the distance the clock signal may have to travel to reach a component), resulting in a systematic clock skew. That is, a systematic clock skew may arise because of unequal distances covered by a clock signal to reach various components.

Clock skew may also depend on various other factors, such as process variations, voltage drop (IR (current times resistance) drop) within the chip, supply voltage fluctuation, temperature gradient within different areas in the chip, etc, creating random clock skew.

An H-tree is commonly used in very large scale integrated (VLSI) circuit design as a clock distribution network for routing timing signals to all parts of a chip, aiming to equalize the distances covered by a clock signal to reach various components within an integrated circuit device, thereby reducing or eliminating systematic clock skew. In an H-tree layout, a set of wires (optionally driven by appropriate signal drivers) for carrying the clock signal is laid out in a tree-like structure. The shape of the layout is such that each division or split of the clocking signal wire leads into two branches of identical length. The result is that each branch of the clocking signal path has the substantially similar impedance characteristics and propagation delay, leading to a balanced clock signal.

FIG. 1 illustrates an exemplary H-tree 10. The H-tree may be used to deliver a clock signal CLK to a clock grid (not illustrated) within an integrated circuit chip (not illustrated). The arrows shown at the end of some of the branches of the H-tree 10 are signal drivers, positioned at different nodes of the H-tree. Note that in FIG. 1, only a few signal drivers of the H-tree 10 have been illustrated for the sake of clarity. As will be readily appreciated by those skilled in the art, although not illustrated, all branch ends (i.e., all the nodes) of the H-tree may have a signal driver. Also note that some of the branches of the H-tree have been magnified in the figure for illustrative purposes only.

The H-tree 10 of FIG. 1 includes a plurality of stages, each stage including respective branches and signal drivers. For example, a $1^{st}$ stage of the H-tree includes signal driver A'1 that drives the signal CLK to the next stage. B'1 and B'2 form the signal drivers of the second stage, and C'1, C'2, C'3, and C'4 form the signal drivers of the $3^{rd}$ stage. As seen from FIG. 1, the H-tree 10 has 9 stages (A, . . . , I). As will be readily understood, with an increase in the stage, the number of signal drivers may double. Hence, for the sake of clarity, from $4^{th}$ stage onwards, only a few of the signal drivers in each stage are illustrated in the figure. For example, for the last stage (i.e., the $9^{th}$ stage), only the drivers I'1, I'2, I'20, I'21, and I'30 are illustrated. The last stage drivers (I'1, I'2, . . . ) of the H-tree 10 may drive a clock network, from which various components within the chip may tap the clock signal.

FIG. 2 illustrates an exemplary grid-shaped clock network 15 that may be provided with clock signals, at various points of the network 15, through the last stage csignal drivers of the H-tree 10 of FIG. 1. For example, the last stage signal drivers I'1, I'2, . . . , I'20, I'21, . . . , I'30, . . . of the H-tree 10 may provide the clock signal CLK at various points of the network 15. The clock network 15 may be included in an integrated circuit chip and may comprise conductive elements or metal strips carrying the clock signal to most parts of the chip. Various components in the chip (not illustrated) may tap the clock signal from different points of the clock network 15, based on the location of a component.

Referring again to FIG. 1, the branches of the H-tree may be symmetrical, as is well known in the art. That is, for each stage, all branches may have substantially equal length. For example, the length of the branch between A'1 and B'1 may be substantially similar to the length of the branch between A'1 and B'2. The same principle applies to the other branches in subsequent stages as well. This balanced nature of the branches and nodes of an H-tree ensure that the length (and the number of nodes) traveled by the CLK signal to reach each of the signal drivers (e.g., I'1, I'2, I'20, I'21, . . . , I'30, . . . ) of the last stage are substantially similar. Thus, the H-tree eliminates any systematic skew of the clock, because the distances covered by the clock signal to reach various areas of the chip are substantially equal.

Additionally, although it is assumed that all nodes of an H-tree include signal drivers, in various embodiments, this may not be necessary, and an H-tree may be easily envisioned with fewer signal drivers. For example, all nodes of a particular stage of an H-tree may not have any signal driver. In various embodiments, if a signal driver of a node in a given stage is added or deleted, similar action may be taken for all other nodes of that stage in order to keep the H-tree balanced. Furthermore, although the signal drivers are illustrated to be positioned at the nodes of the tree, it may not be necessary to do so. For example, a signal driver may be positioned at the middle of a branch, instead of being positioned at a node.

It should be noted that the H-tree 10 of FIG. 1 is exemplary in nature. Various other shapes (having a different number of stages, for example) of an H-tree are also possible. For example, FIG. 3 illustrates various exemplary configurations of H-trees, each with different number of stages.

FIG. 4 illustrates an exemplary voltage drop (sometimes referred to as an IR drop in the art (i.e., current multiplied by resistance)) gradient plot over an area of an exemplary integrated circuit chip. The figure illustrates the spatial nature of the IR drop, i.e., how the IR drop changes over the area of the chip. As is well known in the art and illustrated in FIG. 4, IR drop plots may exhibit approximate ring (or square) like shapes, with higher IR drops at the center of the core and the IR drop lowers as one moves towards the periphery of the chip. For example, referring to FIG. 4, the outer periphery of the chip may experience less IR drop (10 mV) compared to the inner core, which may experience a higher IR drop (50 mV). However, it should be apparent that the numerical values of the IR drop are purely exemplary in nature, and that IR drops may depend on various other factors, such as the supply voltage, the type and form factor of the chip, etc.

Similar to the IR drop, temperature in an integrated circuit chip may also exhibit spatial properties. For example, temperature of a point in the chip may be based on various factors, including but not limited to a distance of the point from the center of the chip. Although not illustrated, die temperature plots may also exhibit approximate ring (or square) like shapes, with hotter rings starting at the center of the core and cooler rings being located towards the periphery, as is well known to those skilled in the art.

The IR drop illustrated in FIG. 4 and the uneven temperature gradient over the area of a chip may affect the working of the H-tree 10 of FIG. 1. For example, the temperature and the IR drop experienced by a signal driver of the H-tree may depend of the distance of the driver from the center (marked by the $1^{st}$ stage signal driver A'1) of the H-tree (note that it is assumed that the center of the chip and the center of the H-tree 10 are identical, although this may not necessarily be the case). For example, all four (C'1, C'2, C'3, and C'4) signal drivers of the $3^{rd}$ stage of the H-tree 10 are equidistant from the center of the tree and hence, experience substantially similar temperature gradient and IR drops. However, branches and signal drivers of subsequent stages may have different distances from the center of the H-tree. For example, signal drivers F'1 and F'20 are both stage $6^{th}$ stage drivers. However, these two drivers have unequal physical distance from the center (at A'1) of the H-tree. That is, although a clock signal may traverse a substantially similar length to reach the drivers F'1 and F'20, the driver F'20 is physically near the center of the H-tree compared to the driver F'1. Similarly, signal drivers I'1 and I'20 (both $9^{th}$ stage drivers) are located at an unequal distance from the center of the chip.

Such unequal distances result in the signal drivers (and corresponding branches) of any given stage experiencing different IR drops and different temperature gradients. For example, signal driver F'20 (located near the center of the chip) may experience a higher IR drop compared to signal driver F'1 (located near the periphery of the chip, see FIGS. 1 and 4). Also, for the same reason, signal driver F'20 may be in a higher temperature region compared to signal driver F'1.

That is, different signal drivers (and corresponding branches) of the same stage of the H-tree 10 may experience different levels of IR drop and different temperatures. This may introduce different amounts of random skews in the signal drivers and branches of the same stage. Consequently, the clock signal reaching different signal drivers of the last stage of the H-tree may experience different propagation delays, resulting in a skew in the clock signal.

SUMMARY

In various embodiments, the present invention provides an apparatus and a method for hybrid clock networks. More specifically, there is provided, in accordance with various embodiments of the present invention, an integrated circuit device including a clock distribution network, the clock distribution network comprising an inner band and an outer band, wherein the inner band may be placed concentrically inside the outer band, and a clock distribution tree including a plurality of stages, each stage including a plurality of signal drivers, wherein all signal drivers of at least one stage of the clock distribution tree may be placed in an area between the inner band and the outer band. In various embodiments, the all signal drivers of at least a last stage of the clock distribution tree may be placed in the area between the inner band and the outer band. All signal drivers of at least another stage may be placed inside the inner band.

In various embodiments, the clock distribution network may further comprise a plurality of shorting bars configured to short the inner band and the outer band. In various embodiments, the clock distribution tree may be configured to supply a clock signal to the inner band and the outer band. Also, for each stage of the clock distribution tree, all signal drivers may be located at a substantially equal distance from a center of the clock distribution tree. In various embodiments, the clock distribution tree may be an H-tree and/or the clock distribution network may be configured to supply a clock signal to one or more components included in the integrated circuit device.

In various embodiments, the integrated circuit device may further comprise a first plurality of unit clock buffers (UCB) coupled to the inner band, and a second plurality of UCBs coupled to the outer band, wherein the first plurality of UCBs and the second plurality of UCBs may be configured to receive a clock signal from the inner and outer bands, respectively. The inner band, the outer band, and the plurality of shorting bars may form a semi-grid structure. Also, a plurality of branches of the clock distribution tree, the inner band, the outer band, and the plurality of shorting bars may comprise conductive elements and may be configured to transmit a clock signal. The inner and the outer bands may be concentric with an outer boundary of the integrated circuit device. In various embodiments, each stage of the clock distribution tree may include a plurality of branches, and for each stage, all branches may have a substantially equal length.

In various embodiments, there is also provided an apparatus comprising a clock distribution network, the clock distribution network including a clock distribution tree having a plurality of stages, each stage including a plurality of signal drivers, wherein for each stage, all signal drivers may be located a substantially distance from a center of the clock distribution tree. The clock distribution network may further include an outer band, an inner band concentrically placed inside the outer band, and one or more shorting bars coupling the inner band and the outer band, wherein for each stage of the clock distribution tree, all signal drivers may lie either inside the inner band or may lie in the area between the inner band and the outer band. In various embodiments, a first plurality of signal drivers of a last stage of the clock distribution tree may be configured to distribute a clock signal to the inner band, and wherein a second plurality of signal drivers of the last stage may be configured to distribute the clock signal to the outer band. In various embodiments, the clock distribution tree may be an H-tree. Each stage of the clock distribution tree may include a plurality of branches; and for each stage, all branches may have a substantially equal length.

In various embodiments, there is also provided a method of forming a clock distribution network in an integrated circuit device, the method comprising forming an outer band, forming an inner band concentrically placed inside the outer band, and shorting the inner band and the outer band through one or more shorting bars, wherein the inner band, the outer band, and the shorting bar may form a semi-grid ring shaped clock distribution network. The method may further comprise forming a clock distribution tree, the clock distribution tree including a plurality of stages, each stage further including a plurality of signal drivers, and placing all signal drivers of at least one stage of the clock distribution tree in an area between the inner band and the outer band. In various embodiments, the method may further comprise placing all signal drivers of at least another stage inside the inner band and/or supplying a clock signal to the inner band and the outer band through the clock distribution tree. Said forming the clock distribution tree may further comprise forming the clock distribution tree such that each stage of the clock distribution tree may include a plurality of branches, and for each stage, all branches may have a substantially equal length.

In various embodiments, there is also provided an apparatus comprising a clock distribution network, the clock distribution network including a clock distribution tree having a plurality of stages, each stage including a plurality of signal drivers, wherein the signal drivers may be positioned such that for each stage, all signal drivers may experience substantially the same level of IR-drop. In various embodiments, for each stage, all signal drivers may experience substantially the same level of temperature gradient. Also, for each stage, all signal drivers may be located at a substantially equal distance from a center of the clock distribution tree.

In various embodiments, the clock distribution network may further include an outer band, wherein a first plurality of signal drivers of a last stage of the clock distribution tree may be configured to distribute a clock signal to the outer band. The clock distribution network may further include an inner band concentrically placed inside the outer band, wherein for each stage of the clock distribution tree, all signal drivers may lie either inside the inner band or may lie in the area between the inner band and the outer band. In various embodiments, each stage of the clock distribution tree may include a plurality of branches, and for each stage, all branches may have a substantially equal length.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 5:
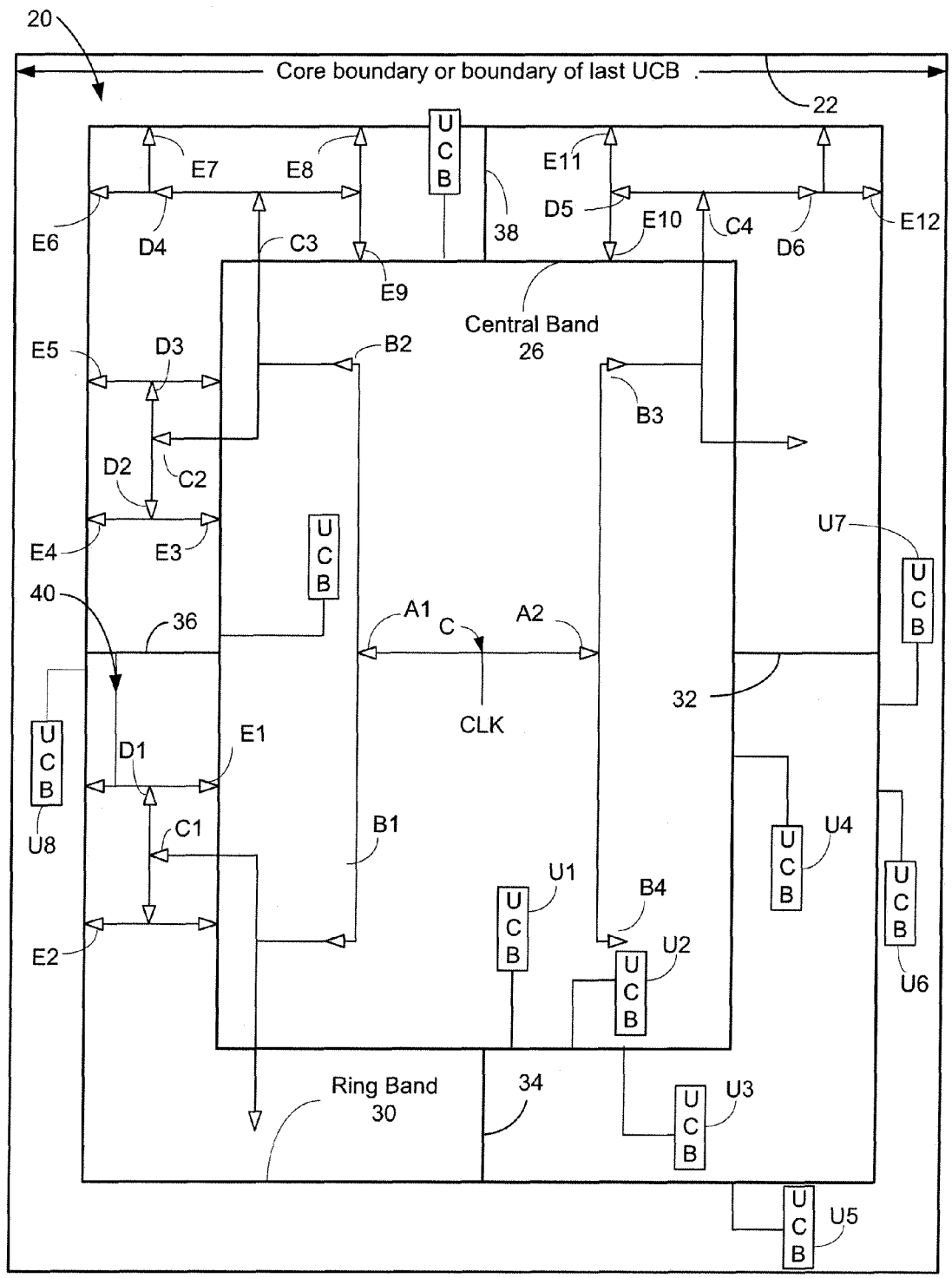
FIG. 5 illustrates an exemplary hybrid clock network, in accordance with various embodiments of the present invention.

FIG. 5 illustrates an exemplary hybrid clock network 20, in accordance with various embodiments of the present invention. The clock network 20 may be included in an integrated circuit chip 22. In various embodiments, the clock network 20 may be a ring-shaped semi-grid network, and may be composed from two evenly and concentrically placed boxes inside one another forming a ring-like shape that may resemble the chip's shape. The two boxes may include shorting bars that may assist to decrease the effects of mismatched loading on the network or effects of random skew on H-tree signal drivers. For example, in various embodiments, the clock network 20 may include a central band 26, a ring band 30, and shorting bars 32, 34, 36, and 38. The central band 26 and the ring band 30 may, in combination, provide the ring shape to the clock network, and may form the semi-grid shape along with the shorting bars 32, 34, 36, and 38. In various embodiments, the central band 26 and the ring band 30 may also be referred to as the inner band and the outer band, respectively.

Figure 6:
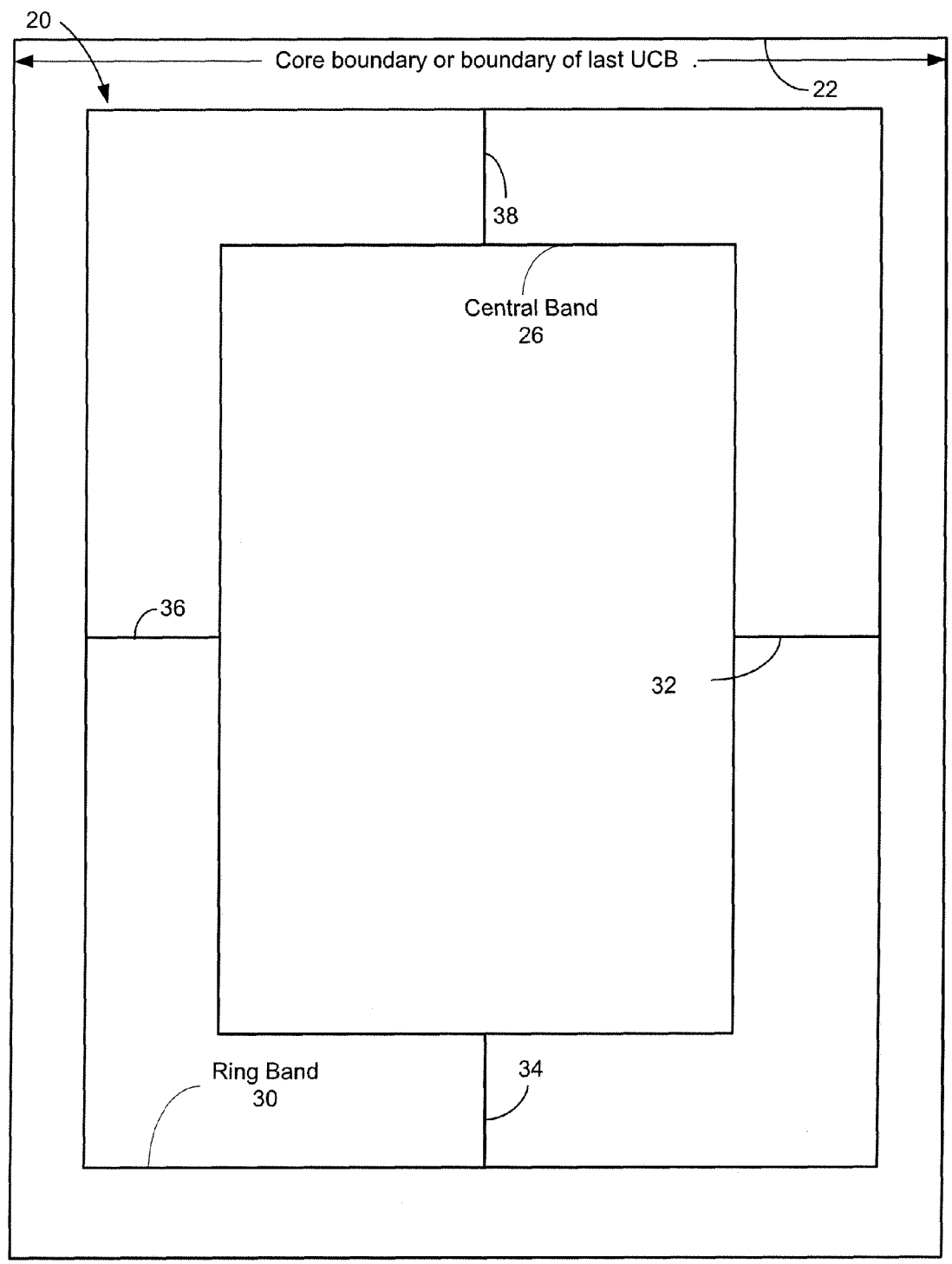
FIG. 6 illustrates another exemplary hybrid clock network, in accordance with various embodiments of the present invention.

The central band 26, ring band 30, and shorting bars 32, 34, 36, and 38 may comprise conductive elements or wires, and may be fed with clock signals at various points through an H-tree. For ease of understanding, only the ring-shaped semi-grid clock network (comprising only the central band 26, ring band 30 and shorting bars 32, 34, 36, and 38), without the H-tree, is illustrated in FIG. 6. Henceforth, in various embodiments, the phrase "ring" in relation to FIGS. 5 and 6 will refer to the ring-shaped space between the ring band 30 and the central band 26.

FIG. 5 also may include a plurality of unit clock buffers (UCB), e.g., UCB 1, ..., UCB 7, that may tap the clock signal from various points in the semi-grid. Various other components (not illustrated) may also tap the clock signal from various points of the clock network 20 based in part on the location of the components with respect to the clock network 20.

As previously discussed, the clock network 20 of FIG. 5 may include an H-tree 40, including a plurality of branches and nodes. For the sake of clarity, only a part of the H-tree 40 is illustrated in the figure. Thus, although FIG. 5 illustrates the H-tree branches and signal drivers only in the top and left portion of the ring, the H-tree 40 covers other areas as well, although not illustrated. Additionally, although the H-tree 40 of FIG. 5 has 5 stages, in various embodiments, the H-tree 40 may have different number of stages, as will be appreciated by those skilled in the art. Also, although the UCBs are illustrated mainly in the right and bottom portion of the figure for clarity purposes, in various embodiments, the UCBs may be connected to other areas of the network as well.

In various embodiments, the ring band 30 and the central band 26 may be placed such that the center of the ring band 30 and the central band 26 may coincide with the center of the integrated circuit chip 22. That is, in various embodiments, the boundary of the chip 22, the ring band 30 and the central band 26 may be concentrically located. In various embodiments, the center of the H-tree 40 (marked by C) may coincide with the center of the chip 22.

In various embodiments, the H-tree 40 of FIG. 5 may include 5 stages (A, ..., E), each stage having appropriate number of branches and signal drivers. For example, the $1^{st}$ stage may include two signal drivers (A1 and A2), while the $2^{nd}$ stage may include signal drivers B1, ..., B4. Note that as previously discussed, not all branches and signal drivers of the H-tree 40 are illustrated for clarity purposes. Thus, the $3^{rd}$ stage may include eight signal drivers, although only four (C1, ..., C4) are illustrated. The last stage (i.e. the $5^{th}$ stage) may include 32 signal drivers (E1, E2, ...), of which only a few are illustrated in FIG. 5.

In the H-tree 40 of FIG. 5, both the $1^{st}$ stage drivers (A1 and A2) may be substantially equidistant from the center of the chip 22 (marked by C), thereby experiencing substantially similar IR drops and a substantially similar temperature gradient. Similarly, the $2^{nd}$ stage drivers B1, ..., B4 may also be substantially equidistant from the center of the chip 22, thereby experiencing substantially similar IR drops and a substantially similar temperature gradient.

The drivers of subsequent stages ($3^{rd}$ to $5^{th}$ stages) of the H-tree 40 may lie within the previously mentioned ring (i.e., between the central band 26 and ring band 30), as illustrated in FIG. 5. Thus, substantially all the signal drivers of stages $3^{rd}$ to $5^{th}$ are almost at similar distances from the center of the chip 22. For example, although E3 and E10, two of the last stage drivers, may not be exactly the same distance from the center of the chip 22, the distances of these two drivers from the center of the chip 22 may be substantially similar. This is in sharp contrast with the H-tree 10 of FIG. 1, where two signal drivers of the same stage (e.g., drivers I'1 and I'20 of the last stage) are located at entirely different distances from the center.

In various embodiments, the H-tree 40 may be balanced in nature. That is, for each stage, the branches may be substantially equal in length. For example, the length of the branch between A1 and B1 may be substantially equal to the length of the branch between A2 and B4. As previously discussed, this balanced nature of the H-tree 40 ensures that the lengths of the paths traveled by the clock signal to reach each of the last stage drivers are substantially equal. As a result, similar to the H-tree 10 of FIG. 1, the clock distribution network of FIG. 5 may not exhibit any systematic skew of the clock signal.

Figure 1:
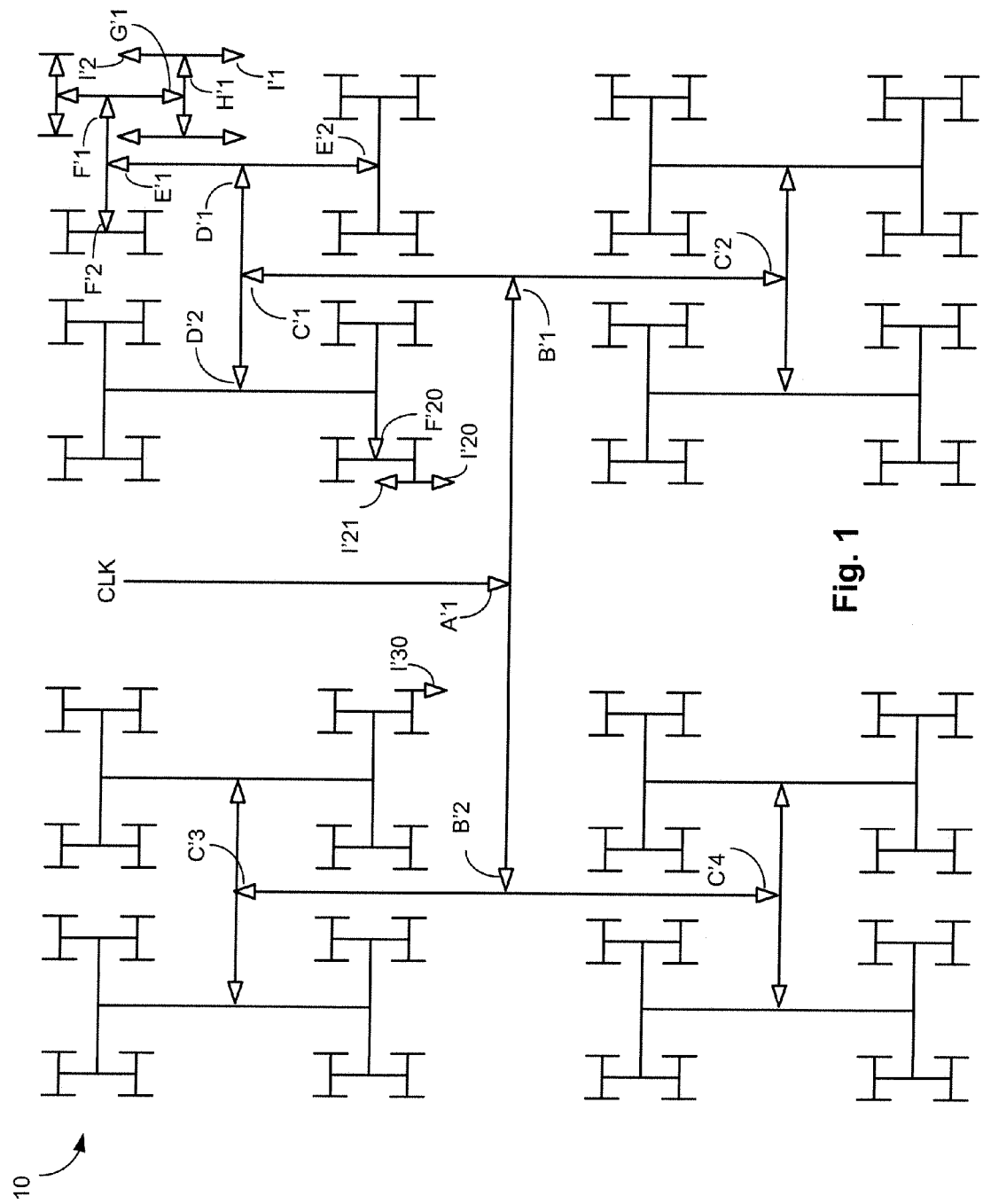
FIG. 1 illustrates an exemplary H-tree.
Figure 2:
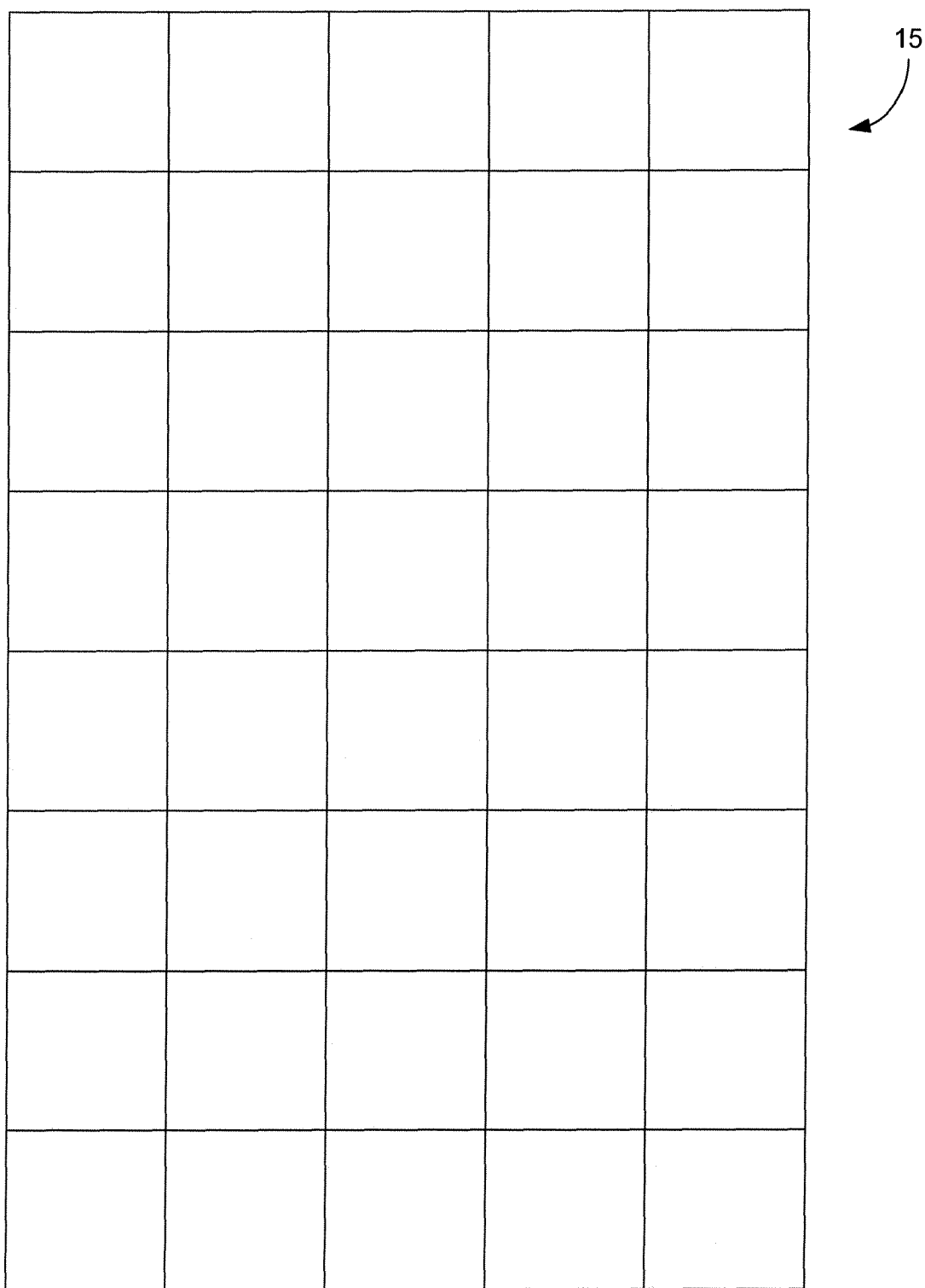
FIG. 2 illustrates an exemplary grid-shaped clock network that may be provided with clock signals through the H-tree of FIG. 1.
Figure 3:
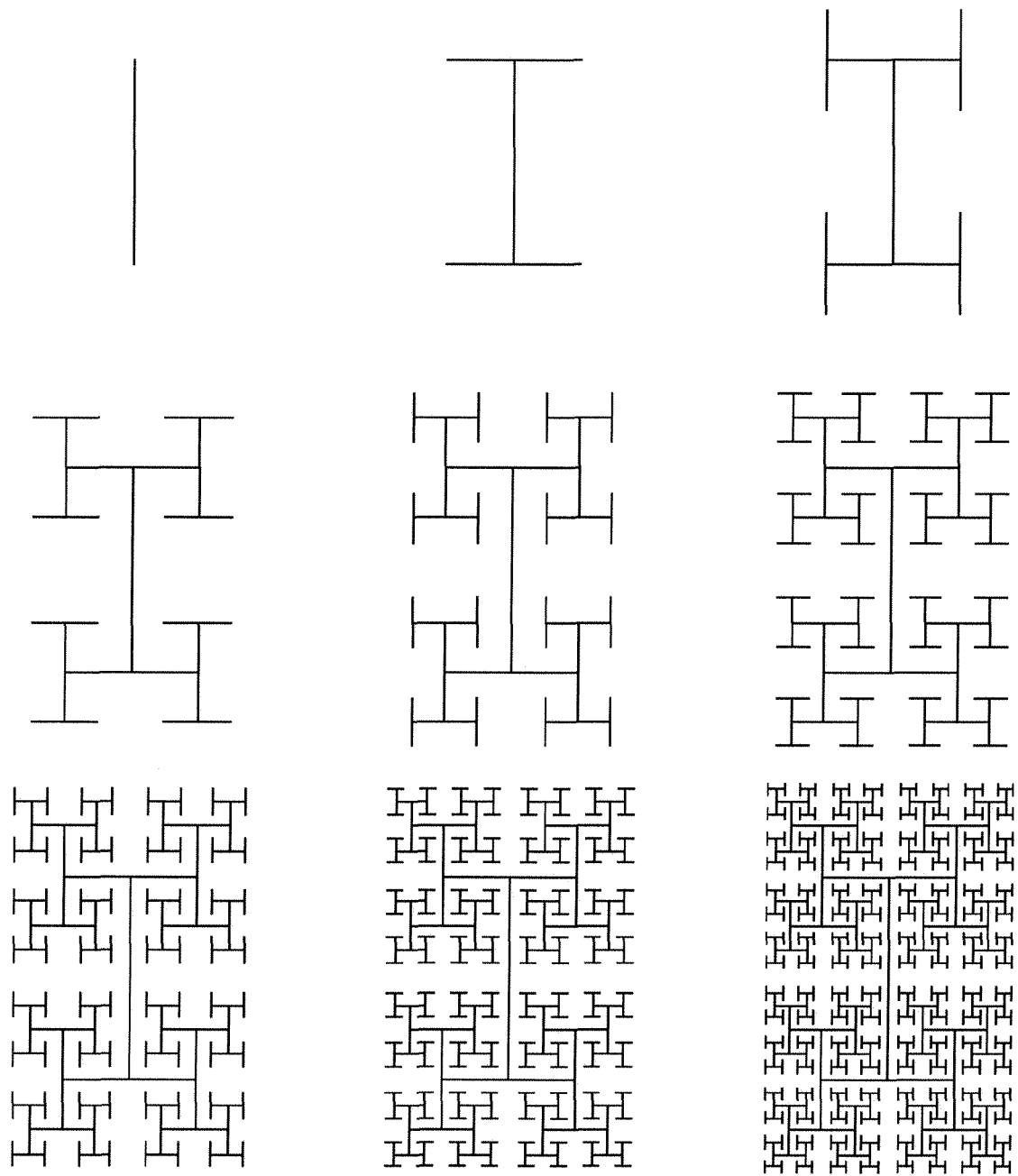
FIG. 3 illustrates various exemplary configurations of H-trees.
Figure 4:
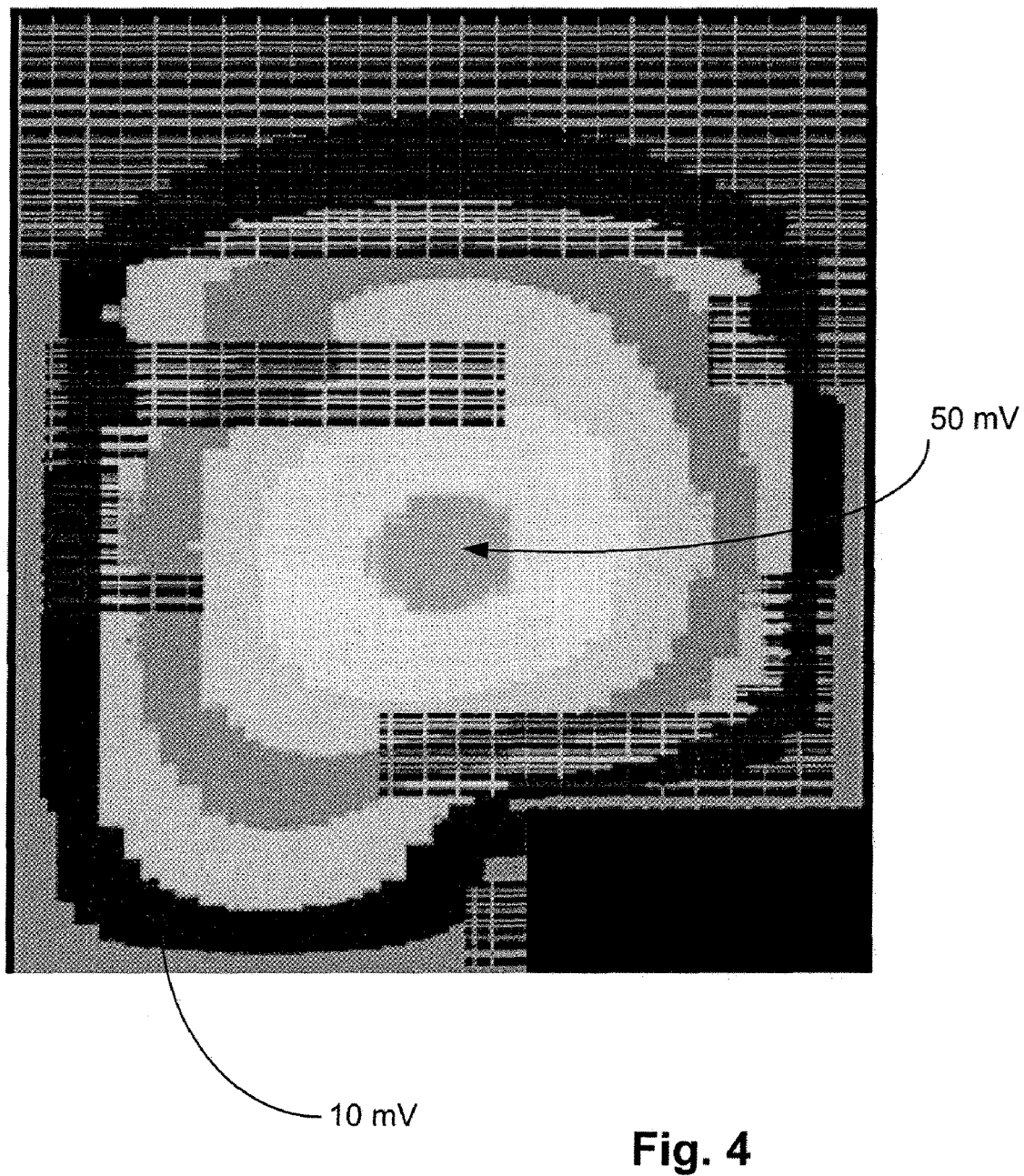
FIG. 4 illustrates an exemplary voltage drop gradient plot over an area of an exemplary integrated circuit chip.

Additionally, the clock distribution network of FIG. 5 may have several advantages over the conventional H-tree 10 of FIG. 1. As discussed with respect to the IR gradient plot of FIG. 4, the area in the ring in FIG. 5 may experience a similar level of IR drop. At the least, in the H-tree 40 of FIG. 5, the later stage drivers (e.g., stages $3^{rd}$ to $5^{th}$) within the ring may experience a reduced difference in IR drops. Also, each of the signal drivers of the $1^{st}$ stage (e.g., A1 and A2) may experience a substantially similar level of IR drop, and each of the signal drivers of the $2^{nd}$ stage (e.g., B1, ..., B4) may experience a substantially similar level of IR drop. Put differently, in various embodiments, the signal drivers may be positioned such that for each stage, all signal drivers experience substantially same level of IR-drop. Similarly, the entire area in the ring may also have a substantially similar temperature gradient (or at the least, have minimal temperature differences). Thus, the later stage drivers (e.g., stages $3^{rd}$ to $5^{th}$) within the ring may experience a reduced difference in temperature gradient. Also, each of the signal drivers of the $1^{st}$ stage (e.g., A1 and A2) may experience a substantially similar temperature gradient, and each of the signal drivers of the $2^{nd}$ stage (e.g., B1, ..., B4) may experience a substantially similar temperature gradient. Put differently, in various embodiments, the signal drivers may be positioned such that for each stage, all signal drivers experience substantially the same level of temperature gradient.

Thus, in various embodiments, all signal drivers of each of the stages may experience substantially similar IR drops and may be exposed to substantially similar temperature levels, and hence, propagation delays and random skews because of IR drops and temperature variations may be similar for all these drivers. As a result, the previously discussed random clock skew due to variations in IR drops and temperature gradients in the H-tree 10 of FIG. 1 may be substantially reduced or even eliminated in the clock distribution network 20 of FIG. 5.

Additionally, the H-tree 40 of FIG. 5 may include later stage drivers (e.g., stages $3^{rd}$ to $5^{th}$) only within the ring. In contrast, a conventional H-tree (e.g., the H-tree 10 of FIG. 1) may include signal drivers in all areas of the chip. This optimal placement of the later stage drivers (e.g., stages $3^{rd}$ to $5^{th}$) within the ring in the H-tree 40 of FIG. 5 may result in a reduction of area covered by the H-tree, without any substantial reduction of the even distribution of clock access tap points throughout the chip 22. The reduction in the area covered by the H-tree may result in lower number of signal drivers and lower number of stages required to cover the entire area of a chip, as compared to the H-tree 10 of FIG. 1. This reduction in the area, accompanied by a corresponding reduction in number of stages and number of drivers in the H-tree 40 of FIG. 5 may result in several advantages, including but not limited to, reduced power consumption, reduced clock network tuning effort, etc. Additionally, because of the reduction in the area covered by the H-tree, various manufacturing parameters (e.g., Le, Vt, tox, etc.) in the integrated circuit 22 may experience less variation in the H-tree area of FIG. 5, and may experience even less variation because of the proximity of the signal drivers for different stages of the H-tree 40.

Thus, the H-tree 40 of FIG. 5 may reduce or even eliminate systematic skew in the clock signal because of its balanced nature (by ensuring that for each stage, all branches have substantially equal length), and the semi-grid, ring-shaped pattern of the clock distribution network 20 may reduce or even eliminate random skew in the clock signal (by ensuring that for each stage, all signal drivers are exposed to substantially similar IR drops and have a substantially similar temperature gradient).

In various embodiments, although not illustrated in FIG. 5, only one of the center band 26 or the ring band 30 may be present in the clock network 20. In these embodiments, there may be other corresponding changes in the network 20 (e.g., the shorting bars and/or some of the last stage drivers may be absent). For example, in various embodiments, the H-tree 40 may include the ring band 30, but not the central band 26. Accordingly, in these embodiments, the H-tree 40 may not include the last stage drivers (e.g., E1, E3, E9, E10, etc.) that are coupled to the central band 26, and also may not include shorting bars 32, ..., 38. Other configurations of the central band 26, ring band 30, shorting bars 32, ..., 38, the branches and/or the signal drivers of the H-tree 40 may also be possible.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An integrated circuit device including a clock distribution network, the clock distribution network comprising:
    an inner band and an outer band, wherein the inner band is placed concentrically inside the outer band, and wherein the inner band and the outer band (i) comprise conductive elements and (ii) are configured to transmit a clock signal; and
    a clock distribution tree including a plurality of stages, each stage including a plurality of signal drivers, wherein all signal drivers of at least one stage of the clock distribution tree are placed in an area between the inner band and the outer band.

2. The integrated circuit device of claim 1, wherein all signal drivers of at least a last stage of the clock distribution tree are placed in the area between the inner band and the outer band.

3. The integrated circuit device of claim 1, wherein the clock distribution tree is configured to supply a clock signal to both the inner band and the outer band.

4. The integrated circuit device of claim 1, wherein for each stage of the clock distribution tree, all signal drivers are located a substantially equal distance from a center of the clock distribution tree.

5. The integrated circuit device of claim 1, wherein the clock distribution tree is an H-tree.

6. The integrated circuit device of claim 1, wherein the clock distribution network is configured to supply a clock signal to one or more components in the integrated circuit device.

7. The integrated circuit device of claim 1, further comprising:
    a first plurality of unit clock buffers (UCB) coupled to the inner band; and
    a second plurality of UCBs coupled to the outer band;
    wherein the first plurality of UCBs and the second plurality of UCBs are configured to receive a clock signal from the inner and outer bands, respectively.

8. The integrated circuit device of claim 1, wherein the inner and the outer bands are concentric with an outer boundary of the integrated circuit device.

9. The integrated circuit device of claim 1,
    wherein each stage of the clock distribution tree includes a plurality of branches; and
    wherein for each stage, all branches have a substantially equal length.

10. An integrated circuit device including a clock distribution network, the clock distribution network comprising:
    an inner band and an outer band, wherein the inner band is placed concentrically inside the outer band; and
    a clock distribution tree including a plurality of stages, each stage including a plurality of signal drivers, wherein all signal drivers of at least one stage of the clock distribution tree are placed in an area between the inner band and the outer band,
    wherein all signal drivers of at least another stage are placed inside the inner band.

11. An integrated circuit device including a clock distribution network, the clock distribution network comprising:
    an inner band and an outer band, wherein the inner band is placed concentrically inside the outer band;
    a clock distribution tree including a plurality of stages, each stage including a plurality of signal drivers, wherein all signal drivers of at least one stage of the clock distribution tree are placed in an area between the inner band and the outer band; and
    a plurality of shorting bars configured to short the inner band and the outer band.

12. The integrated circuit device of claim 11, wherein the inner band, the outer band, and the plurality of shorting bars form a semi-grid structure.

13. The integrated circuit device of claim 11, wherein a plurality of branches of the clock distribution tree, the inner band, the outer band, and the plurality of shorting bars comprise conductive elements and are configured to transmit a clock signal.

14. An apparatus comprising:
    a clock distribution network, the clock distribution network including a clock distribution tree having a plurality of stages, each stage including a plurality of signal drivers,
    wherein for each stage, all signal drivers are located at a substantially equal distance from a center of the clock distribution tree,
    wherein the clock distribution network further includes:
        an outer band;
        an inner band concentrically placed inside the outer band; and
        one or more shorting bars coupling the inner band and the outer band, and
    wherein for each stage of the clock distribution tree, all signal drivers lie either inside the inner band or lie in the area between the inner band and the outer band.

15. The apparatus of claim 14, wherein a first plurality of signal drivers of a last stage of the clock distribution tree are configured to distribute a clock signal to the inner band, and wherein a second plurality of signal drivers of the last stage are configured to distribute the clock signal to the outer band.

16. The apparatus of claim 14, wherein the clock distribution tree is an H-tree.

17. The apparatus of claim 14,
    wherein each stage of the clock distribution tree includes a plurality of branches; and
    wherein for each stage, all branches have a substantially equal length.

18. A method of forming a clock distribution network in an integrated circuit device, the method comprising:
    forming an outer band;
    forming an inner band concentrically placed inside the outer band; and
    shorting the inner band and the outer band through one or more shorting bars;
    wherein the inner band, the outer band, and the shorting bar form a semi-grid ring shaped clock distribution network.

19. The method of claim 18, further comprising:
forming a clock distribution tree, the clock distribution tree including a plurality of stages, each stage further including a plurality of signal drivers; and
placing all signal drivers of at least one stage of the clock distribution tree in an area between the inner band and the outer band.

20. The method of claim 19, further comprising placing all signal drivers of at least another stage inside the inner band.

21. The method of claim 19, further comprising:
supplying a clock signal to the inner band and the outer band through the clock distribution tree.

22. The method of claim 19, wherein said forming the clock distribution tree further comprises:
forming the clock distribution tree such that each stage of the clock distribution tree includes a plurality of branches, and for each stage, all branches have a substantially equal length.

23. An apparatus comprising:
a clock distribution network, the clock distribution network including an inner band, an outer band, and a clock distribution tree having a plurality of stages, each stage including a plurality of signal drivers,
wherein the inner band and the outer band (i) comprise conductive elements and (ii) are configured to transmit a clock signal, and
wherein the signal drivers are positioned such that for each stage, all signal drivers experience substantially the same level of IR-drop.

24. The apparatus of claim 23, wherein for each stage, all signal drivers experience substantially the same level of temperature gradient.

25. The apparatus of claim 23, wherein for each stage, all signal drivers are located at a substantially equal distance from a center of the clock distribution tree.

26. The apparatus of claim 23,
wherein a first plurality of signal drivers of a last stage of the clock distribution tree is configured to distribute a clock signal to the outer band.

27. The apparatus of claim 26,
wherein the inner band is concentrically placed inside the outer band; and
wherein for each stage of the clock distribution tree, all signal drivers lie either inside the inner band or lie in the area between the inner band and the outer band.

28. The apparatus of claim 23,
wherein each stage of the clock distribution tree includes a plurality of branches; and
wherein for each stage, all branches have a substantially equal length.

* * * * *